United States Patent [19]
Ogasawara

[11] Patent Number: 5,233,467
[45] Date of Patent: Aug. 3, 1993

[54] SUPERSONIC WATER-DROP-REMOVING MIRROR ASSEMBLY AND WATER DROP REMOVING METHOD INCLUDING A VIBRATING UNIT SANDWICHED BY A MIRROR HOLDER AT NODES OF A GENERATED STANDING WAVE

[75] Inventor: Morihiko Ogasawara, Niwa, Japan

[73] Assignee: Kabushiki Kaisha Tokai Rika Denki Seisakusho, Aichi, Japan

[21] Appl. No.: 591,115

[22] Filed: Oct. 1, 1990

[30] Foreign Application Priority Data

Oct. 6, 1989 [JP] Japan .................. 1-262573

[51] Int. Cl.$^5$ .............. B60R 1/06; G02B 5/08; G02B 7/182
[52] U.S. Cl. .................. 359/507; 15/250.003
[58] Field of Search .............. 359/507, 512; 15/250.001, 250.003, 250.005; 219/219

[56] References Cited

U.S. PATENT DOCUMENTS

| | | | |
|---|---|---|---|
| 4,929,072 | 5/1990 | Fujie et al. | 359/507 |
| 5,007,722 | 4/1991 | Mori et al. | 359/507 |
| 5,013,888 | 5/1991 | Okada et al. | 219/219 |
| 5,025,187 | 6/1991 | Fujie et al. | 15/250.001 |
| 5,037,189 | 8/1991 | Fujie et al. | 359/507 |
| 5,132,840 | 7/1992 | Okada et al. | 359/512 |
| 5,136,425 | 8/1992 | Fujie et al. | 359/507 |
| 5,148,312 | 9/1992 | Kawai et al. | 359/507 |
| 5,155,625 | 10/1992 | Komatsu et al. | 359/512 |

Primary Examiner—Jon W. Henry

[57] ABSTRACT

Supersonic water-drop-removing mirror assembly and water removing method has a periphery of the double-walled vibrating unit sandwiched by the mirror holder from fore and backside at predetermined points on nodes of generated standing wave. The mirror holder has projections in point contact with the backside of double-walled vibrating unit at predetermined points corresponding to nodes of the standing wave in central portion of double-walled vibrating unit. The projections are formed of an elastic material which absorbs vibration. The mirror plate is first vibrated by the supersonic vibrator with its vibration frequency set at a first level to remove water drops on a front surface of the mirror plate. Next, the vibration frequency of the supersonic vibrator is changed from the first level to a second level so that positions of nodes of standing wave to be generated by said supersonic vibrator are shifted. Subsequently, the mirror plate is vibrated again with the vibration frequency of the supersonic vibrator set at second level to remove the water drops which remain on the front surface of the mirror plate at positions of the nodes of the standing wave which were generated when the vibration frequency was set at the first level.

6 Claims, 3 Drawing Sheets

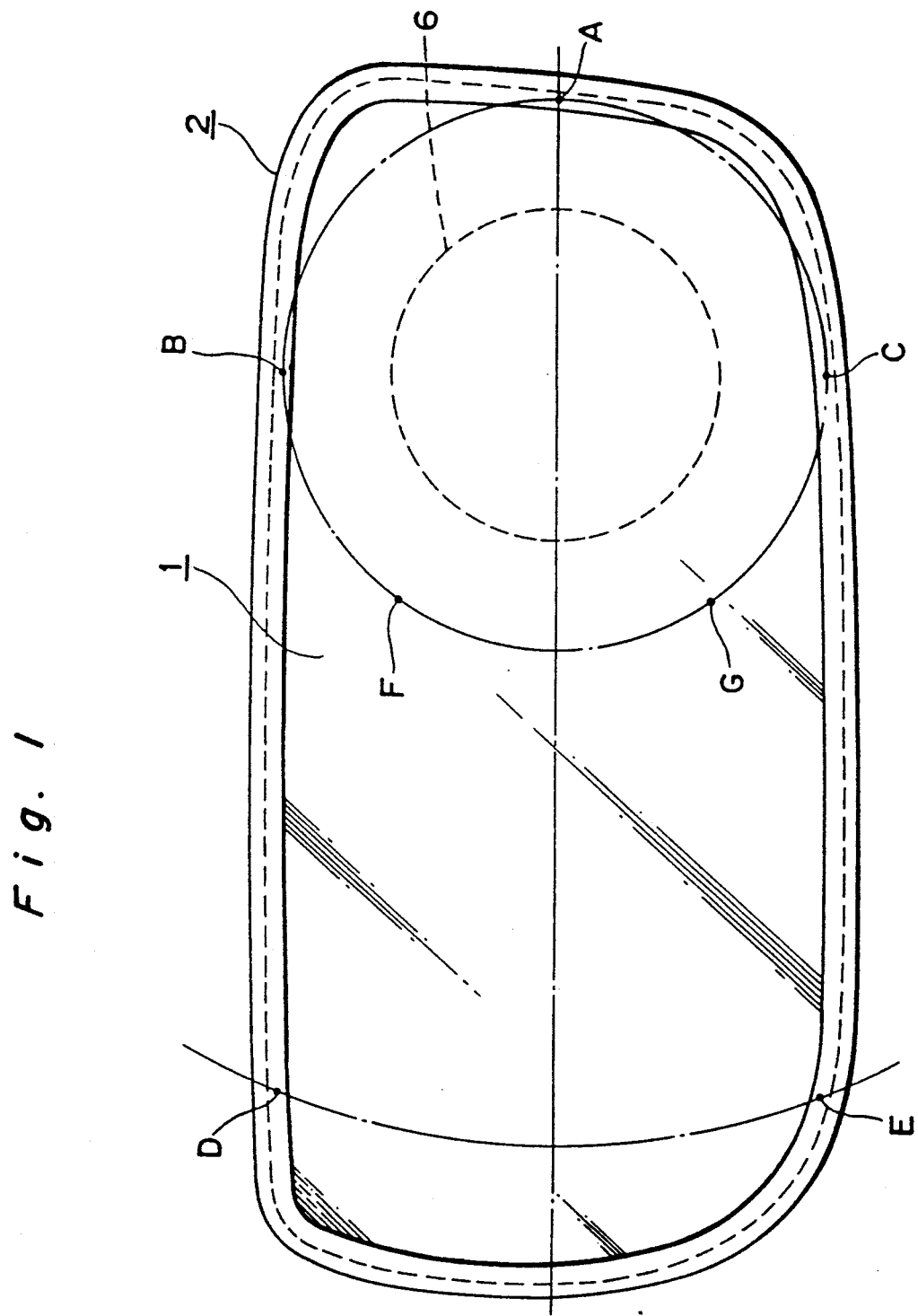

SUPERSONIC WATER-DROP-REMOVING MIRROR ASSEMBLY AND WATER DROP REMOVING METHOD INCLUDING A VIBRATING UNIT SANDWICHED BY A MIRROR HOLDER AT NODES OF A GENERATED STANDING WAVE

BACKGROUND OF THE INVENTION

1. Field of the invention

The present invention generally relates to a supersonic water-drop-removing mirror assembly with which water drops formed on the mirror surface are removed by vibrating the mirror and more particularly to a structure required for holding the mirror plate of such a mirror assembly.

2. Description of the related art

Hitherto, there has been provided an outside mirror assembly for use in an automobile having a function of repelling the water drops formed on and stuck to the mirror surface to lower its visibility.

With this kind of a mirror assembly, a supersonic vibrator normally attached to the backside of the mirror plate. If this vibrator is directly and fixedly attached to the mirror plate, such part of the mirror plate is not vibrated disadvantageously. Hence as seen from FIG. 7 showing the sectional structure of such a mirror assembly, the mirror plate 3 and the vibrating plate 4 behind it to which a supersonic vibrating body 6 is attached are connected in the peripheral portion by means of a connecting-member 5, thus the assembly being formed as a vibrating unit 1 of double-walled structure. In this double-walled vibrating unit 1, the mirror plate 3 and the vibrating plate 4 are made of materials equal in sound transmitting velocity so that the vibrations generated by the vibrator 6 are transmitted efficiently, the individual vibrations being of standing waves roughly equal in waveform. Specific examples of such materials may be glass for the mirror plate 3 and stainless steel or the like for the vibrating plate 4.

As to the mirror assembly for use in automobile, it has been a usual practice to hold the mirror plate 3 from behind with a mirror holder of the type extending to wrap the front periphery of the mirror plate 3 and this mirror holder is fitted in a mirror case via a universal joint. In a supersonic drop-removing mirror assembly of the aforementioned structure, however, rigidly fixing the entire periphery of the double-walled vibrating unit 1 with the mirror holder is not preferable for it means sizably dampening the vibration. With such a mirror assembly, therefore, it is necessary to take proper care to hold the periphery of the double-walled vibrating unit 1 as loose as possible by, for example, holding it at several points. In such a holding structure, however, it is possible that the mirror plate 3 is caused to move due to engine's vibration, due to bad road conditions and resultant vibration of car body running thereon or due to influence of wind the running car is subjected to or the like, this possibly resulting in accidental moving of the mirror plate 3 and lowering of mirror's visibility. Even if the double-walled vibrating unit 1 is held by point contact, it is possible that the vibration generated by the vibrator is dampened depending on the holding position, this possibly also resulting in lowering of the drop-removing performance. Meanwhile, when the vibration is of standing wave, the waveform has nodes where vibration scarcely takes place, hence it is possible that water drops cannot be removed in some parts of the mirror surface.

SUMMARY OF THE INVENTION

Hence, the technical problems to be solved by the present invention are firstly to prevent unnecessary dampening of the mirror's vibration generated by the supersonic vibrator, secondly to ensure against accidental movement of the mirror assembly under influence of wind during running and thirdly to enable removal of water drops on the entire surface of the mirror including where nodes have taken place.

In order to solve the aforementioned technical problems, the present invention provides a supersonic water-drop-removing mirror assembly and water removing method having the following feature, respectively.

A periphery of the double-walled vibrating unit is sandwiched by the mirror holder from fore and backside at its predetermined points on nodes of generated standing wave.

In this structure, the points where the double-walled vibrating unit are sandwiched between the mirror holders are on the nodes of the standing wave, where no vibration can take place essentially, and there is no risk of its vibration to be dampened unnecessarily for this part only is in contact with the mirror holder. Therefore, vibration is transmitted most efficiently to the mirror surface of the double-walled vibrating unit and the water drops formed on the mirror surface can be removed with a remarkable efficiency.

In the above structure, it is preferable to provide a projection which comes into point contact with the backside of the double-walled vibrating unit about the center of the double-walled vibrating unit, that is, nearer to its center than to its periphery and at a predetermined position of the mirror holder corresponding to the node of the aforementioned standing wave.

In this structure, the double-walled vibrating unit may come into contact with mirror holder not only in the peripheral portion but also in the central portion. When the peripheral portion alone is held by the mirror holder, the double-walled vibrating unit may possibly make unexpected movement due to influence of car body vibration or of wind as described above, but in this structure such an unpredictable movement can be precluded thanks to the action of the projection.

Further, the aforementioned projection may preferably be made of an elastic material which slightly absorbs the vibration. In this case, it is preferable to change the vibration frequency by the supersonic vibrator from the first level to the second level so that when the vibration of the second frequency is generated, the water drops formed are removed at the positions of nodes formed when the frequency is at the first level.

Since under the condition of the standing wave vibration the nodes in the mirror surface are scarcely vibrated, it is sometimes the case that the water drops remain stuck in such portions. Since, however, when the frequency is thus changed from the first to the second level, the positions of the nodes varies accordingly, hence the water drops in a part not constantly subjected to vibration are removed and thus water drops can be removed from all over the mirror surface. Meanwhile, at the time when the frequency is at the second level, the double-walled vibrating unit vibrates in such a manner with respect to the projection with its backside going off or coming into contact with the projections formed o the mirror holder to press it in a vibrating mode. In this structure even when contact has taken place in such a manner that the double-walled vibrating unit presses the projections, the vibration of the double-walled vibrating unit is not dampened but, conversely, since the projection is deformed to absorb vibration, it is possible to efficiently remove water drops from all over the mirror surface with the dampening of the vibration being suppressed as far as possible.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects and features of the present invention will become apparent from the following description taken in conjunction with the preferred embodiment thereof with reference to the accompanying drawings which are given by way of illustration only, and thus are not limitative of the present invention, and wherein:

FIG. 1 is a view of the mirror assembly complete with a double-walled vibrating unit, taken from the foreside, according to one embodiment of the present invention;

DETAILED DESCRIPTION OF THE INVENTION

Figure 4:
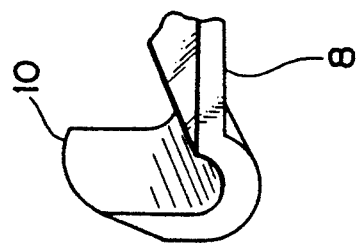
FIG. 4 is a perspective view of the tip holding portion of the second holder constituting the mirror holder.

Before the description of the present invention proceeds, it is to be noted that like parts are designated by like reference numerals throughout the accompanying drawings.

Referring now to FIGS. 1-6 a detailed description will be made below about a preferred embodiment of the present invention.

FIG. 1 is a front view of a mirror holder with a double-walled vibrating unit mounted therein. In the figure, a reference numeral 1 designates a double-walled vibrating unit composed of a mirror plate 3, a vibrating plate 4 and a connecting member 5 therefor, and a reference numeral 2 designates a mirror holder. The circular object indicated by the dashed line is a supersonic vibrator 6 attached to the vibrating plate 4. Normally there is provided a mirror tilting mechanism (not shown) about the center of the mirror holder 2, hence the vibrator 6 is installed off center as illustrated in the figure.

By setting the position of the vibrator 6, the positions for the crest, trough and node of a standing wave at a given frequency can be determined. Here, relatively large water drops are stuck to the mirror surface to cause lowering of its visibility. For repelling such large-sized water drops, it is preferable to generally cause a standing wave in a low frequency range to be generated. In the figure, only the positions of the nodes of the standing wave generated with frequency set at a low level are connected by an alternate long and short dash line. In this embodiment, the double-walled vibrating unit 1 is held by the mirror holder 2, as illustrated in the figure, at the points A-E on the nodes of the standing wave in the mirror's periphery. This is because the points on the nodes do scarcely vibrate, hence fixing these points do not damper the standing wave and the device will be highly efficient in repelling water drops. In order to hold the positions of the nodes of the standing wave highly efficiently, it is so arranged that the supersonic vibrator 6 is positioned at the center of the inscribed circle with respect to the outer periphery of the mirror plate 3.

Meanwhile, when the periphery of the double-walled vibrating unit 1 only is held at the points A-E, there is a risk of the mirror moving accidentally due to vibration of the car body or influence of wind during running as described above about the related art. In this structure, therefore, the points F, G on the nodes of the stationary wave a little toward the mirror's center are affixed to the mirror holder 2 in addition to the aforementioned points A-E. Thus, by positioning the vibrating unit not only in its periphery but also in its central portion, it is possible to . ensure against accidental movement of the mirror's surface.

Hereinafter, the specific holding structure of the double-walled vibrating unit 1 will be explained with reference to FIGS. 2-6.

Figure 2:
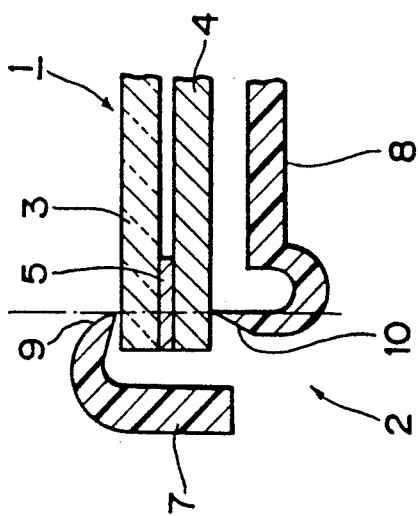
FIG. 2 is a sectional view showing the holding structure of a double-walled vibrating unit in its peripheral portion.

FIG. 2 is a sectional view showing an example of holding structure in the peripheral portion, namely at points A-E. As shown in the figure, the double-walled vibrating unit 1 is sandwiched between a first holder 7 (positioned in the periphery of the double-walled vibrating unit 1) and a second holder 8 (positioned in the backside of the double-walled vibrating unit 1) which together form a mirror holder 2 from foreside and backside. As seen from FIG. 4 being a perspective view of the second holder 8, the holder 8 is hook-shaped and its tip holding portion 10 is arc-shaped so that it comes into point contact with positions on the nodes of standing wave on the backside of the vibrating plate 4. The tip holding portion 9 of the first holder 7 is similarly arc-shaped, hence it comes into point contact with positions on the nodes of the standing wave in the surface of the mirror plate 1. When the peripheral portion of the double-walled vibrating unit 1 is held by such a structure, there is no risk of it causing dampening of vibration, hence vibration is transmitted most efficiently to the mirror plate 3.

Figure 3:
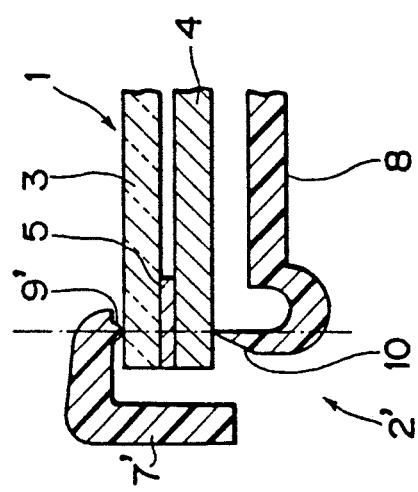
FIG. 3 is another sectional view showing a modification thereof.

FIG. 3 shows an example in which the first holder 7 of the holding structure is modified as 7'. As seen from the figure, the first holder 7' is hook-shaped like the first holder 7 and has a hemi-spheric projection 9' as its tip holding portion. Even if the mirror holder 2' is so formed, the mirror holder 2' is in point contact with the double-walled vibrating unit 1 on the node of the standing wave, hence the vibration from the vibrator is transmitted almost undampened to the whole surface of the double-walled vibrating unit 1.

Figure 5:
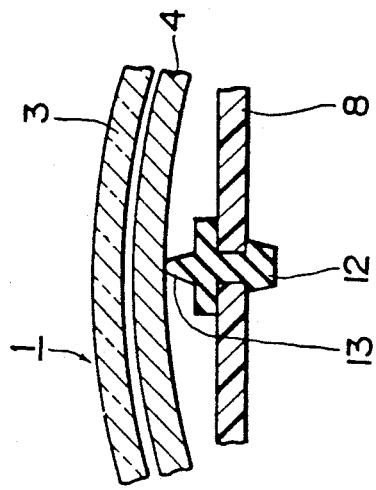
FIG. 5 is still a further sectional view showing a holding structure of the double-walled vibrating unit in its center portion.

FIG. 5 is a sectional view showing an example of the holding structure at the central portion of the double-walled vibrating unit 1, namely at the points F and G. As shown in the figure, the second holder 8 made of a plastic has an elastic hook-sectioned portion whose tip is shaped as a claw 11 extending to somewhat press the backside of the double-walled vibrating unit 1, and the tip of this claw 11 is formed arc-shaped like the second holder shown in FIG. 4.

In this structure the claw 11 is in point contact with the backside of the double-walled vibrating unit 1, hence like aforementioned peripheral portion, this holding portion does not cause dampening of the vibration. Also, since the double-walled vibrating unit 1 is positioned not only in the peripheral portion but also in the central portion, it is less subjected to the influence of the car body vibration or to wind during running hence accidental movement of the mirror plate is precluded.

Meanwhile, the node's position can be changed altering vibration frequency from the first level to the second level so that water drops formed on the nodes of the standing wave, too, can be made repellable with change of frequency to the second level. In this case, when the double-walled vibrating unit 1 is so modified that it suppress the claw 11 as it vibrates by imparting elasticity to the claw 11 as mentioned above, dampening of vibration can be prevented by modifying the claw 11 to move rearward instead of vibration of double wall vibrating unit 1 being dampened.

Figure 6:
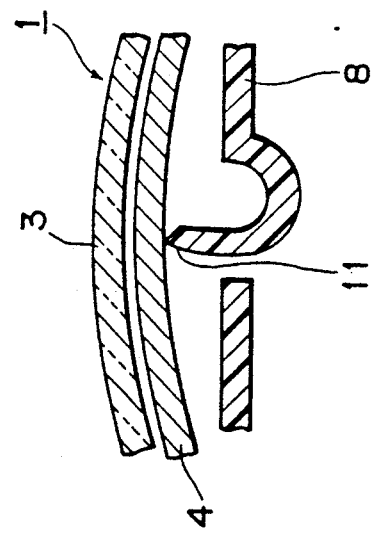
FIG. 6 is another sectional view showing a modification thereof.
Figure 7:
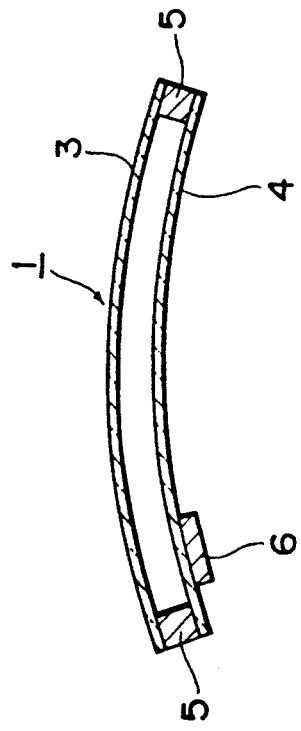
FIG. 7 is a sectional view of a double-walled vibrating unit used in a conventional supersonic drop-removing mirror, as described previously.

FIG. 6 is a view showing a modified example of the projection provided for pushing the double-walled vibrating unit 1 from behind. This projection 13 is formed at one end of a button 12 formed of hard rubber and this button 12 is fixed by incorporating in the second holder 8. It is also possible to form the projection by the use of other elastic material such as a spring. By making it as an elastic member capable of absorbing very slight vibration, it is possible to prevent accidental movement of the mirror plate due to car body's vibration or the like without undue dampening of the vibration of the double-walled vibrating unit 1 by the supersonic vibrator 6, at the same time preventing this projection causing dampening of the vibration.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. A supersonic water-drop-removing mirror assembly comprising;
    a double-walled vibrating unit having a mirror plate, a vibrating plate arranged, in substantially parallel and spaced relationship, behind said mirror plate and a connecting member for connecting said mirror plate with said vibrating plate, and
    a mirror holder for holding said double-walled vibrating unit,
    said vibrating plate being provided with a supersonic vibrator for vibrating said vibrating unit to generate a standing wave,
    a periphery of said double-walled vibrating unit being sandwiched by said mirror holder from fore and backside at predetermined points on nodes of generated standing wave.

2. The supersonic water-drop-removing mirror assembly as claimed in claim 1,
    wherein said mirror holder has projections in point contact with backside of said double-walled vibrating unit at predetermined points corresponding to nodes of said standing wave in central portion of said double-walled vibrating unit.

3. The supersonic water-drop-removing mirror assembly as claimed in claim 2,
    wherein said projections are formed of an elastic material which absorbs vibration.

4. A water drop removing method using a supersonic drop-removing mirror assembly comprising the steps of:
    using a double-walled vibrating unit having a mirror plate and a vibrating plate as part of the supersonic drop-removing mirror assembly, the vibrating plate and the mirror plate being arranged in a substantially parallel and spaced relationship, the vibrating plate being behind the mirror plate and a connecting member being provided for connecting said mirror plate with said vibrating plate;
    providing a mirror holder for holding the double-walled vibrating unit;
    vibrating said mirror plate with a supersonic vibrator to generate a standing sound wave, vibration frequency of the supersonic vibrator being set at a first level to remove water drops on a front surface of said mirror plate;
    positioning a periphery of said double-walled vibrating unit sandwiched between said mirror holder form fore and backsides thereof at predetermined points on nodes of generated standing wave to be generated by the supersonic vibrator;
    changing the vibration frequency of said supersonic vibrator from said first level to a second level so that positions of the nodes of the standing wave to be generated by said supersonic vibrator are shifted; and
    vibrating said mirror plate with the vibration frequency of said supersonic vibrator set at said second level to remove the water drops which remain on the front surface of said mirror plate at positions of the nodes of the standing wave which were generated when said vibration frequency was set at the first level.

5. The water drop removing method as claimed in claim 4, further comprising the step of positioning projections in point contact with the backside of said double-walled vibrating unit at predetermined points corresponding to the nodes of said standing wave in a central portion of said double-walled vibrating unit.

6. The water drop removing method as claimed in claim 5, further comprising the step of forming the projections from an elastic material which absorbs vibration.

* * * * *